Aug. 16, 1966  J. MOOSKIAN  3,266,560
AUXILIARY DETACHABLE WINDSHIELD CONSTRUCTION
Filed May 26, 1964
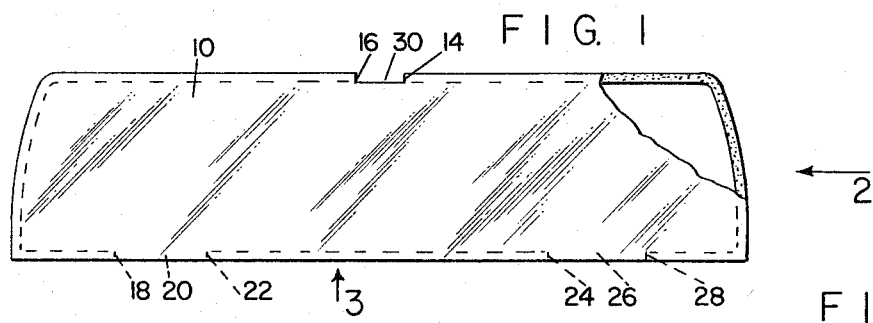
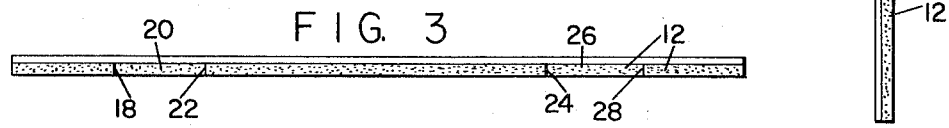
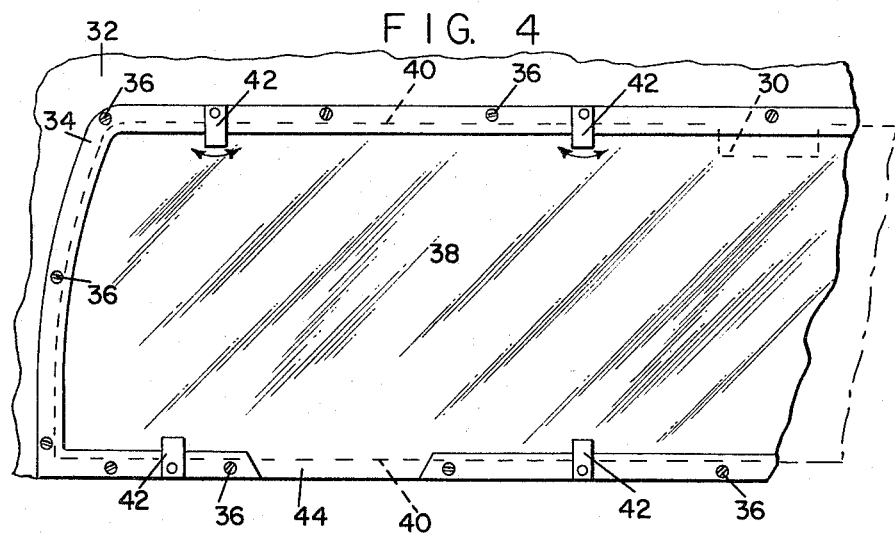
INVENTOR
JOHN MOOSKIAN
BY
ATTORNEY

United States Patent Office 3,266,560
Patented August 16, 1966

3,266,560
AUXILIARY DETACHABLE WINDSHIELD
CONSTRUCTION
John Mooskian, Rte. 146, Sutton, Mass.
Filed May 26, 1964, Ser. No. 370,178
1 Claim. (Cl. 160—368)

This invention relates to a new and improved auxiliary detachable windshield construction, and the principal object of the invention is to provide an extremely simple one piece plastic windshield conforming to the inside aspect of an ordinary vehicle windshield and provided with means for detachably securing the same thereto in spaced relation leaving a relatively slender chamber completely covering the vehicle windshield; and means providing access at the bottom edge thereof for the usual vent for the vehicle heater so that the air forced through this vent has to flow into the space between the normal and the auxiliary windshield, and there being but a single small exit orifice at the top of the windshield for the forced hot air to leave the chamber, whereby the hot air entering the space between the two windshields is forced to thoroughly cover the entire windshield under pressure, so that a much more efficient defrosting and defogging effect is provided.

At the same time the objects of the invention include the provision of means for quickly and easily applying and dismounting the auxiliary windshield from the conventional windshield, so that it can be applied or removed in a matter of seconds.

Other objects and advantages of the invention will appear hereinafter.

Reference is to be had to the accompanying drawings in which:

FIG. 1 is a front view with part broken away illustrating a form of the novel auxiliary windshield;

FIG. 2 is an edge view looking in the direction of arrow 2 in FIG. 1;

FIG. 3 is a bottom view looking in the direction of arrow 3 in FIG. 1, and

FIG. 4 is a partial view of the inside of an ordinary conventional vehicle illustrating the means for mounting the novel auxiliary windshield in position on the usual windshield.

As shown in FIGS. 1, 2 and 3, there is provided a cutout piece of clear plastic 10. This plastic material is preferably self-sustaining but has a degree of flexibility so that it can conform to the shapes and surfaces of modern vehicle windshields at the inside aspect thereof. The plastic sheet 10 is made especially to conform to particular shapes and sizes of windshields and in the event that a vehicle windshield has a divider, then of course the invention contemplates sufficient variance to accommodate it, but the result in construction is essentially the same.

At one side only of the clear plastic sheet 10 there is provided an edge molding of sponge rubber, aerated latex or soft cellular plastic material cemented thereto. This is indicated at 12 and it extends along the top edge of sheet 10 to a point at 14 where there is a gap. It starts again at the point 16 extending around the remainder of the top edge of the sheet and down along the side edge to the point 18. There is a gap at 20 and then it starts again at 22 terminating at 24 leaving a gap 26 similar to that at 20. The next starting point is at 28 and then the edging goes around the opposite side edge as shown in FIG. 1 to the point 14.

The gaps 20 and 26 correspond to the conventional heater vents found in modern vehicles and the points at 14 and 16 define an actual cutout portion or gap in the sheet 10, this being indicated by the reference numeral 30.

It will thus be seen that there are three gaps provided at 20, 26 and 30 and those at 20 and 26 are arranged to conform to the hot air vents of the conventional vehicle. It will be noted that the single gap 30 is a great deal smaller in extent than the combined gaps 20 and 26.

In FIG. 4 there is shown a representation of an inside of a vehicle particularly the roof and side portions thereof, generally indicated at 32 and being broken away to illustrate the usual conventional molding 34 secured by any kind of fasteners such as screws 36 to the vehicle body and holding the glass 38 of the normal windshield in position. The dotted lines 40 indicate the position of the auxilary windshield 10 and it is curved to conform to the windshield 38 if necessary.

The auxiliary windshield is held in position by as many rotating corner brackets or other kinds of clips as may be desired, these being indicated at 42. It wll be seen that the brackets 42 will hold the auxiliary windshield in the position shown but can be turned as indicated by the arrows in FIG. 4 to release the auxiliary windshield 10 so that it can be quickly and easily removed. The corner brackets 42 can be of any kind desired and each one can be held in position by a single screw, rivet or any other construction which will allow the same to rotate as stated. The hot air vent of the vehicle is schematically indicated by reference character 44 and this will coincide with the gap 20 of FIG. 1.

With the auxiliary windshield in the position described and the hot air being turned on, it will be seen that the space between the two windshields, which space corresponds to the thickness of the foam material 12 plus the thickness of the rim 34, will receive this air, but it cannot exit anywhere except through the relatively small opening 30, so that between the two windshields there is provided a sealed chamber under pressure, the pressure clearly ensuring that every square inch of the surface of the windshields shall be passed over by the hot air in an attempt to exit at the gap 30. Thus the entire windshield will be kept clean of ice, snow and fog much more efficiently than if the auxiliary windshield were not used. It is well understood that the usual vents first clear off an inverted triangular portion of the windshield and the operator has to wait until the car heats up before the remainder of the windshield is cleared off. However with the present invention the utmost efficient use is made of the hot air coming from the car heater through the vents such as at 44; and due to the relative sizes of the gaps 20, 26 and 30, this air will be trapped under pressure between the two windshields and thus carry out the functions stated in a very efficient manner as well as speeding the time required for the initial clearing off of the windshield as well as for the complete clearing thereof.

Having thus described my invention and the advantages thereof, I do not wish to be limited to the details herein disclosed, otherwise than as set forth in the claim, but what I claim is:

An auxiliary windshield for use with a conventional windshield having a rim holding the latter in position in a vehicle having a heater and a hot air vent associated therewith, the auxiliary windshield comprising a plain, transparent, substantially flexible sheet that is conformable to the conventional windshield in shape, said sheet having top and bottom edges, a strip of soft flexible material secured to the flexible sheet at the edges of one side surface thereof, said strip forming a seal, with the conventional windshield, and spacing the windshields forming a chamber therebetween, aperture means located in the soft strip at the bottom edge of the auxiliary windshield providing an access for heated air from the hot air vent into the chamber, aperture means located in the soft strip at the top edge of the auxiliary windshield providing an exit for the heated air in the chamber, the aperture means at the top edge of the auxiliary windshield being of less area than the aperture means at the bottom edge to restrict the flow of air through the chamber, providing a pressure rise in the chamber, and means removably securing the auxiliary windshield to the conventional windshield at the edges thereof and holding the soft strip in chamber-sealing condition.

References Cited by the Examiner
UNITED STATES PATENTS

| | | | |
|---|---|---|---|
| 1,870,923 | 8/1932 | Pitrella | 20—40.5 |
| 2,036,230 | 4/1936 | Mulneaux | 20—40.5 |
| 2,111,350 | 3/1938 | Atwood | 20—40.5 |
| 2,212,095 | 8/1940 | Erickson et al. | 20—40.5 |
| 2,389,704 | 11/1945 | Villani | 20—40.5 |

BENJAMIN HERSH, *Primary Examiner.*

LEO FRIAGLIA, *Examiner.*

J. A. PEKAR, *Assistant Examiner.*